United States Patent Office 2,897,175
Patented July 28, 1959

2,897,175
PROCESS FOR THE PRODUCTION OF EPOXY RESINS

Brian Russell Howe, Cardiff, and John Harry Wallice Turner, Cowbridge, Glamorgan, Wales No Drawing. Application May 31, 1955
Serial No. 512,310

Claims priority, application Great Britain June 9, 1954

8 Claims. (Cl. 260—43)

The present invention relates to a new and improved process for the production of valuable epoxy resins. By the term "epoxy resin" is meant throughout this specification a relatively high molecular weight compound containing a plurality of epoxy groups which may be further reacted with other compounds or among themselves to form valuable reaction and/or cross-linked products.

Epoxy resins are well-known, in particular those obtained by etherifying diphenylol propane with haloepoxyalkanes such as epichlorhydrin. Many such resins are available but they suffer from the disadvantage that as their molecular weight is increased their reactivity, as measured by the epoxide oxygen in the molecule, diminishes. This is due to the fact that the epoxy groups themselves are involved in the reaction by which the molecular weight of the product is increased.

Another class of epoxy resin, in which this particular disadvantage has in part been overcome, consists of epoxy resins obtained from phenol-formaldehyde condensation products by etherification with haloepoxyalkanes such as epichlorhydrin. Such resins are described, for instance, in Belgian patent specification 503,549. When such resins are prepared from readily available, comparatively inexpensive phenols such as phenol itself they suffer from the disadvantage that they have low solubilities in hydrocarbon solvents. This fact reduces their utility and also has disadvantages in connection with their method of preparation. Resins obtained from substituted phenols, although having improved solubility characteristics if the substituent group is large enough, have certain disadvantages. For instance, it is often difficult to control the nature and molecular weight of the phenol/aldehyde condensation product and from a given condensation product there is no way by which the solubility characteristics may be widely varied. Moreover, substituted phenols which, under suitable conditions, might give rise to suitable products are expensive and not readily available.

An object of the present invention is to provide a new and improved process for the production of epoxy resins having high reactivity coupled with high molecular weight. A further object is to provide epoxy resins having good solubility characteristics. Another object is to provide a process for the production of epoxy resins having the advantageous properties outlined above from relatively cheap and readily available raw materials.

According to the present invention the process for the production of an epoxy resin comprises modifying a novolak resin, as hereinafter defined, by reaction with an unsaturated aliphatic or cycloaliphatic hydrocarbon and then etherifying the modified resin so produced with a halo-epoxyalkane or a compound which produces a halo-epoxyalkane under the etherification reaction conditions.

The modified novolak resins used in the process of the present invention are thermoplastic products. The modification reaction is carried out by heating the novolak resin with the unsaturated aliphatic or cycloaliphatic hydrocarbon to an elevated temperature in the presence of an alkylation catalyst. By a novolak resin is meant throughout the specification a resin formed by the intercondensation of a monohydric phenol with an aldehyde, preferably formaldehyde which cannot be transformed into the infusible, insoluble state by the application of heat, i.e. the resin is virtually permanently fusible or thermoplastic.

Any novolak resin may be modified to produce the starting material for the process of the present invention, but the invention is particularly valuable when applied to the readily available novolak resins which are made by conventional procedures from monohydric phenols such as phenol itself and its methyl-substituted homologues such as the cresols and the xylenols and mixtures thereof. Such monohydric phenols are readily and economically available on the commercial scale. Other monohydric phenols which may be used in the production of novolak resins which may be modified for use in the process of the present invention include the ethyl phenols, p-tertiary amyl phenol, p-tertiary octyl phenol and para-phenyl phenol.

Any of the lower aliphatic aldehydes may be used in the production of the novolak resins, but, most suitably, formaldehyde or its polymers such as paraform are employed.

The relative proportions of monohydric phenol to aldehyde used in the production of the novolak resins are those customarily used in the art. The chief effect of variations in the phenol-aldehyde ratio is to change the melting point of the modified novolak resin starting material. In general it is preferred that from 0.6 to 1.6 moles of aldehyde, particularly formaldehyde, should be employed for each mole of monohydric phenol used in the production of the novolak resin. When high molar ratios of aldehyde to phenol are employed in the preparation of the novolak resins, not all the aldehyde will necessarily combine with the phenol and consequently any excess is removed during the isolation of the novolak resin.

The novolak resin may be produced by any of the conventional procedures which are well known in the art. Generally the intercondensation of the monohydric phenol and the aldehyde is carried out in the presence of a free acid catalyst such as oxalic acid or hydrochloric acid, but the intercondensation may be carried out in an aqueous reaction mixture, the pH value of which is carefully controlled, for instance within the range 4 to 7, under the influence of various other condensation catalysts. Although the preparation of novolak resins is usually carried out under acid condensation conditions, some resins have been prepared by carrying out the condensation under carefully controlled alkaline conditions, see for example German Patents 668,952 and 673,828 and British Patent 615,488. Such resins, so long as they are novolak resins, i.e. are thermoplastic, may be modified to give starting materials which are quite suitable for the process of the present invention.

The unsaturated aliphatic or cycloaliphatic hydrocarbons used to modify the novolak resins all have at least one unsaturated ethylenic link in the molecule. Examples of such compounds are propene, isobutene, cyclopentadiene, methyl cyclopentadiene and low polymers thereof such as the dimers and trimers of propene di-isobutene, tri-isobutene and di-cyclopentadiene. Particularly suitable are the ethylenically unsaturated aliphatic and cycloaliphatic hydrocarbons containing from 3 to 12 carbon atoms in the molecule. It is well known that such compounds, under the influence of alkylation catalysts, will react with aromatic compounds such as benzene to produce aliphatic substituted benzenes and similarly they may be reacted with novolak resins to produce modified products. Any unsaturated hydrocarbon which has been used to make substituted aromatic compounds from aromatic compounds such as benzene may be used in the production of starting materials for the present invention.

The proportion of novolak resin to unsaturated aliphatic hydrocarbon employed to produce the starting material may be varied widely, but in general it is preferred to employ at least 0.2 part by weight of hydrocarbon for each part by weight of novolak resin. There is no upper limit to the amount of hydrocarbon which may be employed but generally no advantage is gained by employing more than 10.0 parts by weight of hydrocarbon for each part by weight of novolak resin.

The alkylation catalysts used in the modifying reaction are generally strongly acidic compounds and are well known per se in the production of substituted aromatic compounds. They are particularly well known in connection with the alkylation of aromatic compounds such as benzene with alkenes to produce alkyl substituted benzenes. Suitable catalysts include sulphuric acid, perchloric acid, hydrofluoric acid, fluorosulphonic acid and borofluoroacetic acid and acid reacting materials such as aluminium chloride, stannic chloride, boron trifluoride and their solutions or complexes with organic solvents or other organic compounds.

The amount of catalyst used in the modifying reaction may be varied widely according to its reactivity and the reactivity of the resin and the unsaturated hydrocarbon employed. Most suitably the amount of catalyst employed is in the range 0.1–1.5% by weight on the reaction mixture.

The modification of the novolak resin with the unsaturated aliphatic hydrocarbon may be carried out under any suitable conditions and preferably by the direct reaction of the unsaturated aliphatic hydrocarbon with the fused novolak resin. In practice the novolak resins are made by conventional procedures and dehydrated by distillation under reduced pressure or by azeotropic distillation in the presence of a suitable solvent to give the novolak resin in liquid form. The modification reaction is then brought about by adding the unsaturated aliphatic hydrocarbon directly to the liquid novolak resin either batchwise or, preferably, in small portions over a period of time. The catalyst may either be added directly to the liquid novolak resin or it may be added with the unsaturated aliphatic hydrocarbon.

The temperature at which the modification reaction is carried out may be varied widely according to the reactivities of the components of the reaction mixture and that of the catalyst employed. Most suitably the reaction is initiated at a temperature above 50° C. and is carried out under reflux conditions. In order to complete the reaction it is sometimes advisable to heat the reaction mixture after the initial reaction has taken place to an elevated temperature, for instance, to a temperature above 150° C.

A particular advantage of the present invention is that by varying the proportion of unsaturated hydrocarbon used to modify the novolak resin, the solubility characteristics of the resultant epoxy resin may be varied at will; the greater the proportion of hydrocarbon the greater the solubility of the epoxy resins in hydrocarbon solvents.

The etherifying agent which introduces the epoxy groups into the modified condensation product is a haloepoxyalkane or a compound which produces a haloepoxyalkane under the reaction conditions. A haloepoxyalkane has the formula:

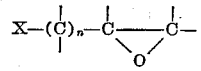

where X is a halogen atom, for instance chlorine or bromine, $n$ is an integer having a value advantageously no greater than 8, and the unsatisfied valencies of the formula are satisfied by hydrogen or hydrocarbon groups. The preferred haloepoxyalkane is epichlorhydrin. Compounds which produce haloepoxyalkanes under the reaction conditions are, for example, the dihalohydrins of which the alpha- and beta-dichlorhydrins and dibromhydrins are preferred.

The etherification of phenolic hydroxyl groups with etherifying agents such as epichlorhydrin is well-known and any of the known procedures may readily be adapted for the process of the present invention.

The most suitable etherification procedures for use in the process of the present invention comprise reacting the modified novolak resin with the etherifying agent in an alkaline medium. The etherification reaction proceeds according to the following scheme:

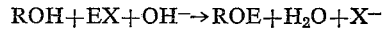

where ROH represents the phenol groups of the oil-soluble resin, EX represents an etherifying agent derived from the halogen acid HX and OH$^-$ represents the alkali. As will be seen from this scheme the etherification reaction, to give the etherified product ROE, involves hydroxyl ions from the alkali and leads to the production of the acid anions X$^-$ and, therefore, there must be sufficient water present in the system to allow the formation of such ions to occur. The preferred alkalies for use in such an etherification process are the alkali metal hydroxides such as sodium or potassium hydroxide. These give rise to the alkali metal ions in the water present in the reaction mixture. When comparatively small amounts of water are present the aqueous solution becomes saturated with the alkali metal ions and the anions of the strong acid and this causes precipitation of the alkali metal salt of the strong acid which is thus removed from the sphere of the reaction.

As will be seen from the above scheme, the amount of alkali present in this type of etherification process should be at least chemically equivalent to the number of phenolic hydroxyl groups it is desired to etherify and preferably a slight excess of alkali on this amount should be employed. It is also advantageous to employ an excess of the etherifying agent. When a compound such as alpha- or beta-dichlorhydrin is used as the etherifying agent, a higher production of alkali is required to neutralize any acid evolved in the formation of the epoxy groups.

The reaction mixture in which the above-mentioned preferred etherification procedure is carried out should be well agitated during the reaction to maintain good contact between the various reacting components therein. This agitation is preferably brought about by mechanical means but it may be brought about, or at least assisted, by maintaining the reaction mixture under reflux conditions. When this procedure is adopted it is necessary to have excess etherifying agent present which may be refluxed or, preferably, to add an inert diluent or solvent for the modified novolak resin to the reaction mixture which has a suitable boiling point so that the reaction may be carried out under reflux of the said diluent or solvent. It is also advantageous to carry out the etherification reaction in the presence of excess etherifying agent or an inert diluent because such a procedure reduces this undesirable possibility that the epoxy groups of the newly formed epoxy resins may interact with unetherified phenolic hydroxyl groups.

For optimum results the amount of water present in the reaction mixture should not greatly exceed the minimum amount of water necessary to bring about the etherification reaction. It has been found that the excess quantities of water tend to react with the etherifying agent which is wasteful of the agent and may, in fact, lead to the production of etherified products having low degrees of etherification.

The preferred etherification procedure comprises mixing the modified novolak resin with the etherifying agent, the latter either being used in a considerable excess or alternatively an inert diluent or solvent is used. A portion of the alkali required together with the requisite quantity of water is then added to this mixture which is held under reflux conditions and the remainder of the alkali necessary to complete the reaction is added in small portions. Alternative procedures in which the alkali used is first dissolved in the minimum quantity of water or in which the etherifying agent is slowly added to a mixture of the modified novolak resin, water and the alkali may be employed.

A typical procedure when epichlorhydrin is the etherifying agent is as follows: the modified novolak resin is dissolved in excess epichlorhydrin or in an inert solvent containing sufficient epichlorhydrin and the mixture is heated to a temperature in the range 60° C. to 110° C. and thereafter a portion of the alkali required in the reaction is added together with the minimum quantity of water necessary to initiate the reaction. The reaction is allowed to proceed at this temperature with periodical addition of the remaining portions of the alkali required. This preferred process may be modified by removing some of the water produced in the etherification reaction as it is formed. This may be achieved by carrying out the reaction under reflux conditions in the presence of a suitable diluent which forms an azeotropic distillate with water and removing the water from the distillate. A further modification of this preferred process consists in adding the alkali periodically to the reaction mixture, dissolved in water, and distilling off the water as fast as it is introduced.

When the reaction is completed the salt formed in the reaction is preferably removed by filtration or centrifugation and, therefore, in order to cause the precipitation of the salt, the quantity of the water in the reaction mixture should be maintained as small as possible. The remainder of the salt formed in the reaction together with any hydrolysis products formed in the reaction may be removed by washing the product with water.

A step in the process which leads to resins having improved colour particularly when epichlorhydrin is the etherifying agent, consists in adding a small quantity of an organic acid sufficient to render the mixture slightly acidic prior to filtration of the salt and the distillation of solvent and excess epichlorhydrin from the mixture.

A particular advantage of the excellent solubility of the epoxy resins of the present invention in hydrocarbon solvents is that they may be extracted from the crude reaction mixture in which they are formed in such a solvent which may then be freed from residual salt by water washing. If the etherified resin is filtered free from the salt formed in the reaction mixture, it is found that the salt removed still contains considerable quantities of etherified product. These residual quantities of resin are readily recovered by extraction with a suitable hydrocarbon solvent and thus the overall yield of product is considerably increased.

The epoxy resins of the present invention may be cured with the aid of curing agents such as amines, polyamines, amides and carboxylic acids. They find many uses, for instance as surface coating or laminating compositions, adhesives or potting compounds.

The following examples illustrate specific methods by which the process of the present invention may be carried out in practice, the parts given being by weight.

*Example 1*

3,000 parts of phenol is mixed with 1,800 parts of 40% formalin and 18 parts of oxalic acid dissolved in 30 parts of water. The mixture is refluxed to the cloud point and then for a further 20 minutes. It is freed from water by distilling under vacuum to 80° C. and then poured to yield a soft, water-white novolak resin. 150 parts of this resin is melted with 55 parts of tri-isobutene and the temperature adjusted to 85° C. 2.0 parts of a boron trifluoride/acetic acid complex containing about 40% boron trifluoride is added and the temperature raised to 200° C. The modified novolak resin thus obtained is a brown sticky solid of melting point 43° C.

140 parts of this modified resin is dissolved in 465 parts of epichlorhydrin and the temperature adjusted to 80° C. 2.6 parts of water and 6 parts of sodium hydroxide pellets are added, and the temperature raised to reflux point with vigorous stirring. After 20 minutes a further 7 parts of sodium hydroxide are added and four similar additions made at 20 minute intervals. On completion of these additions the mixture is refluxed for 30 minutes and the excess epichlorhydrin removed by vacuum distillation to 150° C. The resin is dissolved in 197 parts of xylol and filtered to remove the sodium chloride. The clear filtrate is distilled under reduced pressure to 170° C. to give an epoxy resin, soluble in hydrocarbons and ketones and having an epoxy oxygen content of 6.2%.

Essentially similar epoxy resins are obtained if the tri-isobutene used to modify the novolak resin is replaced with an equal weight of iso-butêne, di-isobutene, propene or a dimer or trimer of propene provided that suitable precautions are taken having regard to the boiling point of the unsaturated aliphatic hydrocarbon employed.

The use of other alkylation catalysts in the reaction modifying the novolak resin does not substantially alter the nature of the final epoxy resin. For instance, repetition of the process of Example 1 using sulphuric acid, aluminium trichloride or stannic chloride in place of the boron trifluoride gives rise to similar epoxy resins.

A similar epoxy resin is obtained if the epichlorhydrin used is replaced with alpha- or beta-dichlorhydrin, provided that sufficient alkali is added to the reaction mixture to neutralise any hydrogen chloride formed in the production of epoxy groups.

*Example 2*

100 parts of a monohydric phenol mixture containing 50–52% m-cresol and conforming to Grade C of British Standard Specification 521/1955, 64 parts of 40% formalin, and 0.6 part of oxalic acid dissolved in 1 part of water, are refluxed together until the mixture clouds. Reflux is continued for 20 minutes and the mixture distilled under vacuum to a temperature of 80° C. to give a substantially oil-insoluble novolak resin.

216 parts of this novolak resin is melted and the temperature adjusted to 125° C. and 1.0 part of fluorosulphonic acid is stirred in. 205 parts of dicyclopentadiene is then added in a slow stream, the rate of addition being adjusted so as to control the resulting exothermic reaction. When all the di-cyclopentadiene has been added the temperature is slowly raised to 200° C. yielding a dark coloured solid resin.

215 parts of this resin is dissolved in 372 parts of epichlorhydrin and the temperature adjusted to 80° C. 2.6 parts of water is then added, followed by a portion of 41 parts of sodium hydroxide and the mixture heated to reflux. The reaction is maintained at reflux by the addition of the remainder of the 41 parts of sodium hydroxide in small portions and the mixture is finely heated under reflux for 30 minutes. The excess epichlorhydrin and water are removed by vacuum distillation to 150° C., and the resin then dissolved in toluene. 2.2 parts of oxalic acid is added and the mixture filtered.

The solvent is removed from the filtrate by vacuum distillation to 150° C., yielding a brown, brittle, solid epoxy resin of epoxide oxygen content 3.5%, soluble in hydrocarbons and ketones.

A further epoxy resin may be prepared by the process described in Example 2, if the meta-cresol novolak resin used therein is replaced with an equal quantity of a novolak resin made from a mixture of cresols and xylenols known as "American Duty Free Cresol" by refluxing 2,300 parts of the phenol mixture with 1,400 parts of 40% formalin and 12 parts of oxalic acid dissolved in 20 parts of water for 70 minutes and recovering the resin by conventional means.

We claim:

1. A process for the production of an epoxy resin which comprises bringing a novolak resin which is the condensation product of a monohydric phenol with an aldehyde into intimate contact with an ethylenically unsaturated non-aromatic hydrocarbon which contains from 3 to 12 carbon atoms and an acidic alkylation catalyst to produce a thermoplastic product and then etherifying said thermoplastic product with a haloepoxyalkane, said haloepoxyalkane having the structure

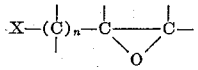

wherein X is a halogen atom, $n$ is an integer not greater than 8, and the free valences are satisfied by members selected from the group consisting of hydrogen and hydrocarbon groups.

2. A process as claimed in claim 1, wherein the novolak resin is obtained by the inter-condensation of a member of the group consisting of phenol, the cresols, the xylenols and mixtures thereof with formaldehyde.

3. A process as claimed in claim 1, wherein the ethylenically unsaturated nonaromatic hydrocarbon is selected from the group consisting of propene, isobutene, cyclopentadiene, methyl cyclopentadiene and dimers and trimers of any of the aforesaid compounds.

4. A process as claimed in claim 1, wherein the haloepoxyalkane employed is epichlorhydrin.

5. A process for the production of an epoxy resin which comprises bringing a novolak resin formed by intercondensation of a monohydric phenol with an aldehyde into intimate contact with an ethylenically unsaturated non-aromatic hydrocarbon containing from 3 to 12 carbon atoms and an acidic alkylation catalyst to form a modified novolak resin, dissolving the modified novolak resin so produced in excess epichlorhydrin and thereafter adding the minimum quantity of water necessary to initiate the etherification of the phenolic hydroxyl groups of the modified novolak resin together with a portion of an amount of alkali at least chemically equivalent to the number of phenolic hydroxyl groups, the remainder of the alkali being added in portions as the etherification reaction proceeds.

6. A process for the production of an epoxy resin which comprises bringing a novolak resin formed by intercondensation of a monohydric phenol with an aldehyde into intimate contact with an ethylenically unsaturated non-aromatic hydrocarbon containing from 3 to 12 carbon atoms and an acidic alkylation catalyst to form a modified novolak resin, dissolving the modified novolak resin so produced in an inert solvent containing epichlorhydrin and thereafter adding the minimum quantity of water necessary to initiate the etherification of the phenolic hydroxyl groups of the modified novolak resin together with a portion of an amount of alkali at least chemically equivalent to the number of phenolic hydroxyl groups, the remainder of the alkali being added in portions as the etherification reaction proceeds.

7. A process as claimed in claim 5, wherein chloride salt formed in the etherification reaction and excess epichlorhydrin are removed from the reaction mixture after the latter has been rendered slightly acidic by the addition thereto of an organic acid.

8. A process as claimed in claim 6, wherein chloride salt formed in the etherification reaction and the inert solvent are removed from the reaction mixture after the latter has been rendered slightly acidic by the addition thereto of an organic acid.

References Cited in the file of this patent

UNITED STATES PATENTS

| 1,451,843 | Plauson | Apr. 17, 1923 |
| 2,114,121 | Bender | Apr. 12, 1938 |
| 2,247,411 | Rostler et al. | July 1, 1941 |
| 2,658,885 | D'Alelio | Nov. 10, 1953 |
| 2,716,099 | Bradley et al. | Aug. 23, 1955 |

FOREIGN PATENTS

| 676,117 | Germany | May 26, 1939 |

UNITED STATES PATENT OFFICE
CERTIFICATE OF CORRECTION

Patent No. 2,897,175 July 28, 1959

Brian Russell Howe et al.

It is hereby certified that error appears in the above numbered patent requiring correction and that the said Letters Patent should read as corrected below.

In the grant, lines 1 and 2, for "Brian Russell Howe, of Cardiff, and John Harry Wallice Turner, of Cowbridge, Glamorgan, Wales," read -- Brian Russell Howe, of Cardiff, and John Harry Wallice Turner, of Cowbridge, Glamorgan, Wales, assignors to The Distillers Company Limited, of Edinburgh, Scotland, a British Company, --; line 11, for "Brian Russell Howe and John Harry Wallice Turner, their heirs" read -- The Distillers Company Limited, its successors --; in the heading to the printed specification, lines 4 and 5, for "Brian Russell Howe, Cardiff, and John Harry Wallice Turner, Cowbridge, Glamorgan, Wales" read -- Brian Russell Howe, Cardiff, and John Harry Wallice Turner, Cowbridge, Glamorgan, Wales, assignors to The Distillers Company Limited, Edinburgh, Scotland, a British Company --.

Signed and sealed this 26th day of April 1960.

(SEAL)
Attest:

KARL H. AXLINE
Attesting Officer

ROBERT C. WATSON
Commissioner of Patents